(12) United States Patent
MacPhail

(10) Patent No.: US 6,501,469 B1
(45) Date of Patent: Dec. 31, 2002

(54) ARRANGEMENT OF INFORMATION TO ALLOW THREE-DIMENSIONAL NAVIGATION THROUGH INFORMATION DISPLAYS WITH INDICATION OF INTENDED STARTING POINT

(75) Inventor: Margaret Gardner MacPhail, Austin, TX (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/451,944

(22) Filed: Nov. 30, 1999

(51) Int. Cl.$^7$ .............................................. G06T 15/00
(52) U.S. Cl. ....................... 345/419; 345/746; 345/836; 345/440
(58) Field of Search ................................ 345/419, 348, 345/349, 339, 340, 581, 764, 810, 836, 846, 440; 707/517

(56) References Cited

U.S. PATENT DOCUMENTS

| | | | |
|---|---|---|---|
| 5,493,692 A | | 2/1996 | Theimer et al. |
| 5,515,488 A | | 5/1996 | Hoppe et al. ................ 345/440 |
| 5,550,559 A | | 8/1996 | Isensee et al. ............... 345/684 |
| 5,689,718 A | * | 11/1997 | Sakurai et al. ............... 707/517 |
| 5,696,915 A | | 12/1997 | Johnston, Jr. et al. ....... 345/804 |
| 5,768,578 A | | 6/1998 | Kirk et al. .................... 707/100 |
| 5,801,747 A | | 9/1998 | Bedard ......................... 725/46 |
| 5,859,639 A | | 1/1999 | Ebrahim ...................... 345/788 |
| 5,867,281 A | * | 2/1999 | Nozoe et al. ................ 258/402 |
| 5,924,090 A | | 7/1999 | Krellenstein |
| 5,937,163 A | | 8/1999 | Lee et al. ..................... 709/218 |
| 5,991,799 A | | 11/1999 | Yen et al. |
| 6,097,393 A | * | 8/2000 | Prouty, IV et al. .......... 345/419 |
| 6,259,443 B1 | | 7/2001 | Williams, Jr. ................ 345/741 |
| 6,271,827 B1 | | 8/2001 | Matsumoto ................... 345/601 |
| 6,275,229 B1 | * | 8/2001 | Weiner et al. ............... 345/339 |
| 6,275,266 B1 | | 8/2001 | Morris et al. ................ 348/552 |
| 6,286,141 B1 | | 9/2001 | Browne et al. ................ 725/39 |
| 6,314,415 B1 | | 11/2001 | Mukherjee .................... 706/41 |

OTHER PUBLICATIONS

Kirste et al., "A Presentation Model for Mobile Information Visualization," 1996 Comput. & Graphics, vol. 20, No. 5, pp. 669–681.

* cited by examiner

Primary Examiner—Mark Zimmerman
Assistant Examiner—Huedung X. Cao
(74) Attorney, Agent, or Firm—Kevin L. Daffer; Conley, Rose & Tayon P.C.; Leslie Van Leeuwen

(57) ABSTRACT

A method of configuring information for display includes assigning continuum labels to pieces of information, or information units, accessible by a computer system. The continuum labels may be used in arranging the information units into ordered sequences, or continuum arrangements. Criteria for ordering of the information units within the continuum arrangement may include, for example, the level of detail of the subject matter of the information units or the degree to which the subject matter of an information unit is related to that of a reference information unit. Formation of continuum arrangements may be done by entering data into a data structure or rules database, or by a method of using a graphical user interface to establish sequences of icons representing information units.

Forming continuum arrangements to configure information may allow display of the information in a form allowing rapid, convenient viewer access to desired pieces of information. In a method of displaying information, a set of three axes is configured on a display screen, and selectable regions are configured in the vicinity of the set of axes, where each selectable region corresponds to an information unit. The position of the selectable region corresponding to an information unit is determined by a set of coordinates proportional to values of x-axis, y-axis and z-axis attributes corresponding to x-axis, y-axis and z-axis continuum labels assigned to the information unit. Selection of one of the selectable regions by a viewer of the display screen causes the corresponding information unit to be displayed on the display screen.

34 Claims, 10 Drawing Sheets

| | 32 | | 34 | | 36 |
|---|---|---|---|---|---|
| Label | | Attribute | | Value | |
| "pointer" | | reference/pointer | 43 | information unit object handle | |
| "gendetail" | | level of detail--general | 38 | general indicator, e.g. "high" | |
| "specdetail" | | level of detail--specific | | specific indicator, e.g. "5" or "c" | |
| "contname" | 40 | continuum arrangement name | 42 | "North American Birds" | |

*Fig. 2a*

| | 32 | | 34 | | 36 |
|---|---|---|---|---|---|
| Label | | Attribute | | Value | |
| "pointer" | | reference/pointer | | information unit object handle | |
| "x-axis" | | percentage confidence from search terms | 44 | percentage, e.g. "79" | |
| "y-axis" | | level of detail with respect to reference information unit | 46 | indicator, e.g. "4" or "-2" | |
| "z-axis" | | relatedness with respect to reference information unit | 48 | indicator, e.g. "2" or "25" | |
| "yrefunit" | | pointer to reference information unit for "y-axis" | | object handle of y-axis reference information unit | |
| "zrefunit" | | pointer to reference information unit for "z-axis" | | object handle of z-axis reference information unit | |
| "startpt" | 50 | intended starting point? | | answer, e.g., "yes" | |

*Fig. 2b*

ARRANGEMENT OF INFORMATION TO ALLOW THREE-DIMENSIONAL NAVIGATION THROUGH INFORMATION DISPLAYS WITH INDICATION OF INTENDED STARTING POINT

RELATED APPLICATIONS

This application is related to the following copending U.S. patent applications, filed on even date herewith: "Arrangement of Information for Display Into a Continuum Ranging From Closely Related to Distantly Related to a Reference Piece of Information" by MacPhail, "Information Grouping Configuration for Use With Diverse Display Devices" by MacPhail, "Establishment of Information Display Policy for Diverse Display Devices" by MacPhail, "Arrangement of Information Into Linear Form for Display on Diverse Display Devices" by MacPhail, "Arrangement of Information to Allow Three-dimensional Navigation Through Information Displays" by MacPhail, "Navigation Through Displayed Information Using Minimum Display Screen Area" by MacPhail, "Arrangement of Information for Display Into a Continuum According to Level of Detail" by MacPhail, "Graphical Display of Path Through Three-dimensional Organization of Information" by MacPhail, and "Method of Using a Graphical User Interface to Configure Information for Display" by MacPhail.

BACKGROUND OF THE INVENTION

1. Field of the Invention

This invention relates to information organization, and more particularly to a method of arranging pieces of information into at least three continuum arrangements, where each continuum arrangement may be associated with an axis in a three-dimensional representation of a collection of the information, and where one of the pieces of information is designated as an intended starting point for navigation through the collection. The method may be useful for multiple applications involving display of information, including platform management in heterogeneous systems.

2. Description of the Related Art

The following descriptions and examples are not admitted to be prior art by virtue of their inclusion within this section.

Increasing capability of computers, coupled with a proliferation of other information-based devices, including telephones, pagers, and personal digital assistants (PDA's), have contributed to continually increasing amounts of available information. This large quantity of information can lead to difficulties in finding specific information, and particularly in finding the information conveniently and efficiently.

As an example, it can be difficult for a viewer accessing a piece of information to know how that information is related to other information available from the same source. The source of information may be, e.g., an application program or an Internet site (also called a "World Wide Web" or "web" site). In other words, it can be difficult to tell what other information may be available, and how the information is intended to be organized by its developer. Current approaches to providing guidance to a consumer or viewer of information, which may be used on, e.g., web sites or application displays, include tables of contents or organizational trees. Such displays typically require a large amount of screen space, however, which may be particularly disadvantageous if the viewer is using a small-screen device such as a telephone or PDA. Other techniques, such as dividing displayed information into separate displays accessible using, for example, folder tabs along the top of a display window, don't allow the viewer an overview of all of the available information at once.

Even if a consumer or viewer of information is aware of the intended organization of a collection of information, accessing a particular desired piece of information can still be difficult because a limited number of specific navigation paths through the information collection may be provided. For example, information on a web site is typically arranged in a hierarchical structure in which "clicking" upon multiple "links" is required to reach a piece of information having the desired specificity or detail on the desired topic. This problem may be further exacerbated for a user of a small-display device, because only a small portion of the information intended to appear on a display screen may be viewable on the screen of the small-display device at any one time. Such limitations of the navigation pathways established by a developer of an application or web site may also make it difficult to move from one desired piece of information to another efficiently. For example, even remembering and/or retracing a path taken through a collection of information can present challenges. Although web browser programs often include a "history", or listing of the most recent web pages visited, this history may be erased by accessing some web pages. Furthermore, the web page names listed in the history may not provide a sufficient description of the pages' subject matter to convey a relationship between the path taken and the overall organization scheme of the information. Such a relationship may be observable by comparing the history to the organization of the web site, but this may require clicking back and forth between multiple web pages (thereby complicating the browser history further).

In view of the problems described above, it would be desirable to develop a method by which a consumer of information could quickly ascertain the intended organization of a collection of information. It would further be desirable to allow the consumer to easily observe a path taken through the collection of information in the context of its organization. In some cases, a method of allowing the consumer to establish criteria for organization of displayed information would be preferable, so that desired pieces of information may be more quickly accessible.

SUMMARY OF THE INVENTION

The problems outlined above are in large part addressed by methods described herein of configuring information for display and displaying information. The methods of configuring information involve arranging pieces of information, or information units, into ordered sequences, or continuum arrangements. Depending on the embodiment, an information unit may take various forms, including, for example, a value of a system or network variable being monitored by a system administrator for a computer system, an address (also called a Universal Resource Locator, or URL) of a web page provided by a web search application, or a portion of the material included in a web page. Criteria for ordering of the information units may include the level of detail of the subject matter of the information units, the degree to which the subject matter of an information unit is related to that of a reference information unit, and/or other criteria, which may be defined by either the consumer or the organizer of the information The arrangement of information units into one or more continuum arrangements typically involves assigning one or more continuum tags, or labels, to each information unit. Such labels are a form of "meta-data", or data about data. In particular, a label preferably corresponds to a particular attribute of the data, and the value of that attribute. The label is linked to the corresponding piece of data (or information unit as described herein). In a preferred embodiment, this linking is implemented by relating the label to a reference or pointer to the information unit, where the relating is done using some sort of data structure. "Data structure" as used herein refers to a collection of pieces of data (which may be meta-data) and any relationships between the pieces of data. One such data structure may be a rules database which contains rules, or policy, for assigning the continuum labels to information units. "Policy" as used herein refers to one or more rules established in advance of a particular situation or event to govern the response of a computer system to that event.

Establishing policy for arranging information units into continuum arrangements may be particularly useful in embodiments for which configuration of ad hoc information is desired. Ad hoc information refers to information generated or organized in response to a particular event or request, as opposed to static information which is always presented in the same form. Examples of ad hoc information include an alarm message generated in response to a failure detected in a monitored system, as might occur in a system administration application, or a list of URL's provided by a search engine in response to specific search criteria given by a user. Ad hoc information units may therefore not exist in advance of a triggering event which gives rise to the ad hoc information. Setting policy for collection of such information units and assignment of labels to them after they are created therefore allows establishment of continuum arrangements even for ad hoc information units.

The assignment of continuum labels to establish a continuum arrangement of information units as described above may be done by directly entering labels into a data structure relating labels and information units, or into a rules database containing policy for assignment of labels to information units. Alternatively, establishment of one or more continuum arrangements may be performed using a graphical user interface (GUI). In such an embodiment, icons representing information units may be moved using a pointing device and arranged into sequences on a display screen. The information unit icons may be arranged with respect to an axis, pair of axes, or set of three axes configured on the display screen, thereby establishing one-dimensional, two-dimensional or three-dimensional configurations. In some embodiments, the sequences of information unit icons may also be formed without reference to an axis on the screen, or multiple one- or two-dimensional sequences may be entered to form a single three-dimensional configuration of information units. The configuration of icons may be entered into the computer system using the GUI, and assignment of labels to corresponding information units subsequently performed by one or more programs executable on the computer system, thereby establishing a configuration of the actual information units.

Configuration of information units for display using the methods described above may allow the information units to be displayed in a form which allows rapid, convenient viewer access to desired pieces of information. For example, in a method of displaying information contemplated herein, a set of three axes is configured on a viewer's display screen. Selectable regions are configured in the vicinity of the set of axes, where each selectable region corresponds to an information unit. The position of the selectable region corresponding to an information unit with respect to the set of axes is determined by a set of coordinates proportional to values of x-axis, y-axis and z-axis continuum attributes (corresponding to x-axis, y-axis and z-axis continuum labels). Selection of one of the selectable regions (by using a pointing device, for example) causes the corresponding information unit to be displayed on the display screen. The axes and selectable regions are preferably retained on a portion of the display screen alongside the displayed information unit, and a current position icon illustrating the position of the selectable region corresponding to the displayed information unit is preferably displayed.

In some embodiments, other icons may be displayed in the vicinity of the set of axes, such as an intended starting point icon showing the starting point intended by the developer or organizer of the collection of information for navigating through the information. Other icons may also include a user starting point icon, showing the position corresponding to the information unit through which a viewer actually enters the collection of information, and an interim point icon showing the position corresponding to an information unit previously displayed. A path between a user starting point icon and a current position icon may also be displayed. Furthermore, a visible indication may be given when a pointer displayed on the screen is moved across one of the selectable regions and/or one of the axes. The visible indication may be, for example, a word descriptive of the subject matter of the information unit corresponding to an underlying selectable region, or a word descriptive of the criterion by which information units are arranged along an axis.

The methods described above for configuring and displaying computer-based information are believed to provide multiple advantages to a consumer of the information. For example, in some embodiments the consumer may establish one or more continuum arrangements of information units, so that the information is organized in a way that makes sense to the consumer. The consumer would therefore know how the information is organized, allowing more rapid access to a desired piece of information, or information unit. The method of using a GUI to form an arrangement of information unit icons may provide a particularly simple, intuitive way of configuring information units.

Even in embodiments for which the information is not configured by the consumer, use of the above-described method for displaying information may allow rapid observation by a viewer of the intended organization of a collection of information. For example, the use of visible indicators which identify information units corresponding to selectable regions underlying a pointer is believed to allow the content and organization of a three-dimensional configuration of information units to be efficiently ascertained. The criteria used in forming such a three-dimensional configuration may also be observed in embodiments for which a visible indicator characterizing the criteria for organization of information along an axis is displayed when a pointer is positioned over the axis. Display of a current position icon may allow a relationship between the currently displayed information unit and the organization of the collection of information to be readily ascertained, and display of other icons and/or a path between positions of selectable regions previously selected may provide further understanding of the viewed information in the context of the overall collection of information.

In addition to allowing improved knowledge of the intended organization of a collection of information, the method of displaying information may also greatly enhance the ability of a viewer to rapidly select a desired piece of information, and to readily "jump" from one piece of information to another. Because any of the information units are available for selection by selecting the corresponding selectable region arranged about the displayed set of axes, the viewer is freed from following a preset path between information units, as is often required in applications or web sites having a hierarchical structure. The above-described methods are therefore believed to allow a significant reduction in the time required for a viewer to identify and access a desired piece of information.

The methods described herein are believed to be useful in many situations involving display of information. One such situation may involve platform management. "Platform management" generally refers to ensuring the effective operation of application programs, systems, or networks on one or more "platforms," where a platform refers to a specific hardware configuration and/or operating system. Platform management may be particularly challenging in systems or networks including multiple heterogeneous platforms. Such systems may also be referred to by other terms, such as "multiple heterogeneous systems," and management of them may also be called, for example, "cross-platform management." Platform management of a multiple heterogeneous system may often involve remote management of at least some parts of the system, and failure detection and reporting become increasingly important with increased system complexity. As an example of application of the methods described herein to platform management, a system administrator for a computer system may arrange multiple system and network quantities to be monitored into one or more continuum arrangements. The value of such a system or network quantity at a given time may correspond to an information unit in such an embodiment. Various criteria could be used for establishing continuum arrangements in this case, such as relevance of the information unit to the health of a particular application program or likelihood of the information unit to indicate a failure within the system. Innumerable other types of information collections, such as results of an Internet search, web pages collected in a web site, collections of electronic mail messages or values of some quantity of interest (e.g., a stock price) as a function of time, to name a few, may also be configured and displayed using these methods.

It is noted that the methods described herein may be advantageously combined with the methods of grouping information for display and setting display preferences described in related application "Establishment of Information Display Policy for Diverse Display Devices" by MacPhail, filed on even date herewith, and hereby incorporated by reference as if set forth herein. This application includes methods of setting policy for display of information units, including establishing groups of information units and priority sequences of information units. This setting of display policy may be particularly advantageous for viewing information on a small-display device, so that the information most important to the viewer may be quickly and efficiently forwarded to the display device. As an example, in some embodiments of the methods described herein, the information units may be larger than will fit on the display screen of a small-display device such as a telephone or PDA. This could be the case if an information unit is a web page, for example. In such an embodiment, the information units could be broken down into smaller sub-units, and the sub-units could be configured for display by setting display policy as described in the above-mentioned related application.

In addition to the methods described above, a computer-usable carrier medium is contemplated herein. The carrier medium may be a storage medium, such as a magnetic or optical disk, a magnetic tape, or a memory. In addition, the carrier medium may be a transmission medium, such as a wire, cable, or wireless transmission path along which the program instructions are transmitted, or a signal carrying the program instructions along such a wire, cable or wireless transmission path. In some embodiments, the carrier medium contains program instructions executable on a computer system for implementation of the methods described above, while in other embodiments the carrier medium may contain a data structure or rules database containing a continuum arrangement of information units or policy for forming such a continuum arrangement.

BRIEF DESCRIPTION OF THE DRAWINGS

Other objects and advantages of the invention will become apparent upon reading the following detailed description and upon reference to the accompanying drawings in which:

FIG. 2 illustrates the content of exemplary data structures and/or rules databases which may be included on a carrier medium associated with the computer system of FIG. 1;

Figure 1:
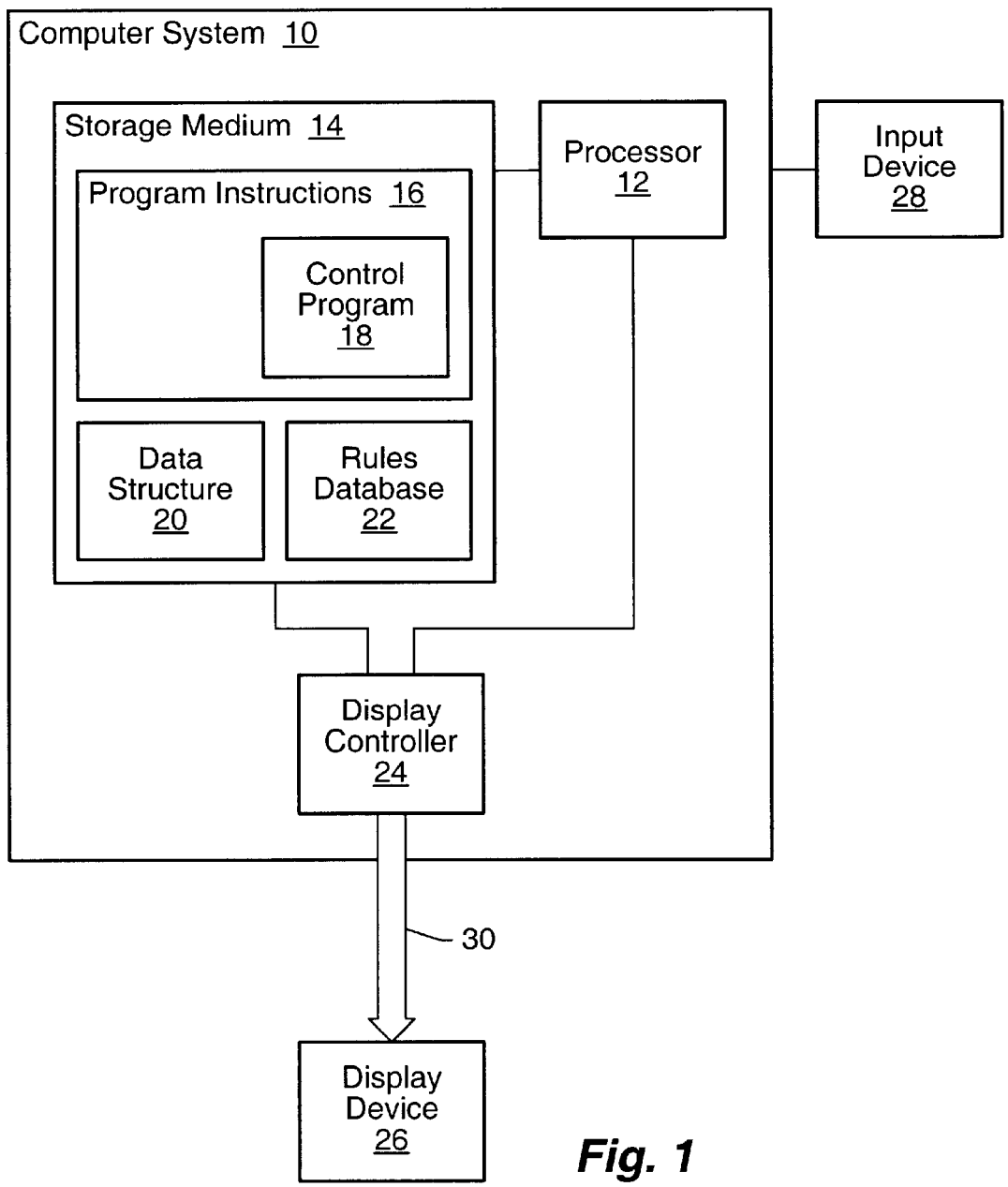
FIG. 1 is a block diagram illustrating an embodiment of a computer system and display device which may be used to implement the methods described herein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

A block diagram illustrating an exemplary embodiment of a computer system which may be used to implement the methods described herein is shown in FIG. 1. Computer system 10 includes processor 12, which is coupled to storage medium 14 and display controller 24. Storage medium 14 may take many forms, such as volatile or nonvolatile memory, a magnetic disk such as a hard drive or floppy disk, an optical disk, and/or a magnetic tape. Storage medium 14 may include program instructions 16, data structure 20, and/or rules database 22 (which could also be considered a type of data structure), described in more detail below. Display controller 24 configures data for display on a display device such as display device 26, and may provide an interface between computer system 10 and display device 26. Display device 26 is preferably a display screen, and may be formed within various devices, such as a monitor, laptop computer, telephone, pager or PDA. Such a display screen may be formed using various technologies, including liquid crystal display (LCD) technology, cathode ray tube (CRT) technology or projection technologies. Furthermore, display device 26 may be a display screen having one of many different sizes. Display controller 24 is adapted to send an appropriate amount of data to display device 26, an amount which may vary depending on the size of the display.

In the embodiment of FIG. 1, data structure 20 is a collection of interrelated data stored in storage medium 14. As described further below in connection with FIG. 2, data structure 20 may include multiple pieces of data (and/or meta-data) and the relationships between the pieces of data. In particular, data describing continuum arrangements of information units accessible using computer system 10 may be included in data structure 20. "Accessible using a computer system" or "accessible by a computer system" as used herein refers to information units which may be found stored on the computer system or a network associated with the system, or created using the computer system. Such continuum arrangements may additionally or alternatively be stored within rules database 22. In the embodiment of FIG. 1, rules database 22 is a database in which rules are stored which define policy for the configuration of information units for display. An example of such a rule could be: "space available on disk C constitutes more detailed information than does space available throughout the network" or "the rate of writes to database B measured 5 minutes before failure of application A is the reference information unit for forming continuum arrangement 2." Rules database 22 may be accessed by a program such as control program 18, which monitors and detects events which may trigger a display of information units. Such an event might be, for example, a message from an application program or operating system of a failure, or an instruction from a user to display a particular piece of information. When a display of information units is indicated, control program 18 may access the rules database to determine the rules applicable to the particular information unit being displayed, and collect the information needed by display controller 24 to display according to the pre-established policy. This collecting of information may involve the creation of one or more data structures similar to data structure 20, which may be forwarded to display controller 24 so that the appropriate information units may be sent to display device 26. Such formation of data structures dynamically at such time as they are needed is believed to advantageously allow display policy to be predetermined for even ad-hoc information, which may not exist prior to the time at which its display is required.

As used in the methods described herein, display controller 24 may be linked to storage medium 14. This linkage allows display controller 24 to take into account display policy information which may be included on storage medium 14 when configuring data to forward to display device 26. Display controller 24 and display device 26 are connected by carrier medium 30, in this case a transmission medium. Carrier medium 30 may therefore include a wire, cable, or wireless transmission path, or a signal traveling along such a wire, cable or wireless path. In embodiments for which display device 26 is remotely located with respect to computer system 10, carrier medium 30 may contain both "wired" and wireless portions. Computer system 10 may be connected to at least one input device 28 through which a user may enter information into the computer. Input device 28 may be a device used for manual entry of information, such as a keyboard or pointing device, or a device such as a disk drive or tape drive for receiving stored information. In some embodiments, a user may also input information using display device 26, using a transmission medium similar to carrier medium 30.

It is noted that a computer system suitable for the methods described herein may include other components not explicitly shown. For example, other input/output devices and/or interfaces may be included. Furthermore, in the block diagram of FIG. 1 the blocks are intended to represent functionality rather than specific structure. Implementation of the represented system using circuitry and/or software could involve combination of multiple blocks into a single circuit or program, or combination of multiple circuits or programs to realize the function of a block. For example, storage medium 14 may include memory associated with various elements, including processor 12 and display controller 24. Furthermore, the elements within computer system 10 may be related using various levels of integration. For example, storage medium 14, processor 12, and display controller 24 may be integrated onto a single board or a single chip, or, alternatively, may not be within the same case. Storage medium 14, for example, may be external to the case of computer system 10, particularly in embodiments for which it is a disk or tape.

Exemplary embodiments of contents of a data structure such as data structure 20 are illustrated in FIG. 2. The table of FIG. 2a includes data which may be included in a data structure corresponding to a particular information unit. Such a data structure may be employed, for example, when an object-oriented approach is used to implement the methods described herein. In such an approach, each information unit may be considered an "object". The data of FIG. 2a may be used to define attributes of such an object. In the embodiment of FIG. 2a, each of the labels 32 assigned to an information unit corresponds to an attribute 34 and a value 36 of that attribute. For example, the value of general level of detail attribute 38, assigned the label "gendetail" in the embodiment of FIG. 2a, is a general indicator such as "high" or "low". (Quotation marks are used in FIG. 2 to denote actual exemplary values, while entries not in quotation marks are descriptions of a suitable value.) Both "gendetail" and "specdetail" of FIG. 2a may be considered continuum labels as used herein, in that they are associated with attribute values which indicate a position in a continuum of information units. "Contname" label 40 corresponds to continuum name attribute 42 and is used to include the information unit described by the data structure in the "North American Birds" continuum. The information unit described by the attributes and values of FIG. 2a is referenced by the value of reference/pointer attribute 43, where the value is the object handle of the information unit.

An object handle as used in an object-oriented programming approach may be considered a name (typically an alphanumeric character, word, or phrase) used to reference the object. Operations performed with respect to the object are described by a programmer in terms of the object handle. The object handle is associated with the actual object using, e.g., some sort of data structure. The object handle may be stored in a completely different storage location than that used to store the actual object, however. As noted above, the table of FIG. 2a includes information in a data structure associated with an information unit within the continuum "North American Birds". Other information units may be included within this continuum by including label 40 in other data structures similar to that illustrated by FIG. 2a, where the other data structures correspond to and reference these other information units. In the embodiment of FIG. 2a, information units within the continuum "North American Birds" are assigned values of general and specific level of detail attributes, according to the level of detail of the subject matter of the information unit. For example, a piece of information describing North American eagles in general might be assigned a lower level of detail than an information unit describing feeding habits of red-winged blackbirds.

A continuum of information units as used herein may be considered an embodiment of a group of information units. In particular, a group substantially larger can be displayed on a display screen and may be considered to contain an effectively infinite stream of information units (with respect to the capacity of the display), and may be arranged as a continuum of information. In some embodiments, the information units forming the continuum may be chosen with input from the viewer of the information units. In particular, the content of the continuum may be closely-related, or tightly-bound, information on a topic of interest to the viewer. A data structure similar to that of FIG. 2a may also be used to establish attributes for a continuum of information units. Such attributes may include, e.g., preferred page breaks to be used when sending information from the continuum to a display, or a position of the continuum in a priority sequence of multiple continua.

Another example of the content of a data structure for an information unit is shown in FIG. 2b. In this embodiment, multiple continuum labels, in this case "x-axis", "y-axis" and "z-axis", are assigned to the information unit corresponding to the data structure. The embodiment of FIG. 2b may be used to establish a three-dimensional configuration of information units, wherein the continuum arrangements associated with the "x-axis", "y-axis" and "z-axis" continuum labels may be associated with x-, y- and z-axes, respectively, in a three-dimensional representation. In FIG. 2b, the attributes corresponding to the continuum labels might be suitable in configuring information for an Internet search application. Accordingly, attribute 44 corresponding to the "x-axis" continuum label reflects the percentage confidence that the information unit matches search terms input by a user of a search engine. In this embodiment, the x-axis continuum is formed based on input from a consumer (the search terms), and may therefore contain information units having tightly-bound subject matter, as discussed above.

Attribute 46 associated with the y-axis continuum label in the embodiment of FIG. 2b is the level of detail of the information unit as compared to a reference information unit. The reference information unit provides a reference with which other information units in a continuum may be compared to assess quantities such as level of detail or relatedness of the subject matter of one information unit with respect to another. In some embodiments, reference information units are established using input from a consumer of the information. For example, reference information units used in the embodiment of FIG. 2b could be established from those closest in subject matter to Internet search terms entered by a consumer.

A reference information unit is also used in attribute 48 corresponding to the z-axis continuum label, where the value of this attribute indicates the relatedness of the subject matter of the information unit to that of a reference information unit. The attributes corresponding to the y-axis and z-axis continuum labels are not necessarily established with respect to the same reference information unit, as illustrated by the assignment of separate pointers, labeled "yrefunit" and "zrefunit", to the reference units associated with the y-axis and z-axis continuum labels, respectively. The value of attribute 46 is an indicator of the level of detail of the information unit with respect to the appropriate reference information unit. In an embodiment, a positive number may be used for an information unit having subject matter with a higher level of detail than that of the reference unit (more specific subject matter), while a negative number is used for an information unit having less detailed (more general) subject matter. The value of attribute 48 is an indicator of the relatedness of the information unit with respect to a reference information unit. In an embodiment, a smaller number may be used to indicate that the subject matter of the information unit is more closely related to that of the reference information unit, and a larger number to indicate less related subject matter. Other scales could be used to assign values to attributes 46 and 48, however, and other indicators, such as letters, capable of being sequenced could also be used.

Another label assigned to the information unit characterized by the data of FIG. 2b is "startpt" label 50. This label corresponds to an attribute characterizing whether the information unit is the intended starting point of a collection of information units to which it belongs. The value of this attribute may be used in determining a position at which to display an intended starting point icon within a representation on a display screen of the collection of information. Such representations of information on a display screen are discussed further with reference to FIG. 4 below.

The content and length of an information unit, such as those to which the attributes in FIG. 2 correspond, may vary significantly depending on the application for which information is configured for display. For example, an information unit may include a number representing a quantity such as available disk space, an alphanumeric Internet site address, alphanumeric words and/or phrases displayed on a web page, or an entire electronic mail message or other document. As noted above in the Summary of the Invention section, the methods described herein of configuring information for display and displaying information may be combined with methods of setting information display preferences as described in related application "Establishment of Information Display Policy for Diverse Display Devices" by MacPhail. Display preferences which may, for example, be advantageous in viewing information on small-display devices may include priority sequences, grouping arrangements, and/or preferred positions of information units on a display screen. Label assignments used to establish such preferences, described further in the above-mentioned related application, may be included in some embodiments with data such as that of FIG. 2 establishing continuum arrangements. In other embodiments for which information units are relatively large, an information unit may be divided into sub-units, and data structures similar to those of FIG. 2 may be used to establish display preferences for the sub-units.

The data structures of FIG. 2 are merely exemplary, and these data structures, as well as all data structures described herein, may be implemented in various configurations. For example, attributes of more than one information unit or continuum arrangement could be combined in one data structure in some embodiments, or continuum arrangement attributes and information unit attributes could be combined within a data structure. In other embodiments, different criteria for arranging information units within a continuum arrangement may be used. For example, information units could be arranged into a continuum arrangement in chronological order. Alternatively or in addition to the object-oriented approach suggested by the examples of FIG. 2, other data structure forms may be used. For example, a look-up table including multiple information units and the associated continuum labels could be formed.

The particular method by which continuum arrangements of information units are formed may vary, and the method may depend on whether the information units form static information or ad hoc information. For ad hoc information, a continuum arrangement typically cannot be formed by assigning continuum labels to existing information units, because at least some of the information units may not exist in advance of a triggering event. Possible triggering events may include, for example, detection of a failure by an application program monitoring the performance of a system (such as a computer system or network) or execution of an Internet search program to generate search results. Continuum arrangements for ad hoc information may therefore be formed by setting policy in advance, where the policy provides rules for forming continuum arrangements of information units after the information units are created. The data of FIG. 2b, for example, may be put into a data structure by a control program such as control program 18 of FIG. 1. The control program may access policy stored in, for example, a rules database to obtain rules for forming such a data structure. In the case of static information (the information regarding North American birds in FIG. 2a could be an example of static information contained on, e.g. a web page), on the other hand, a continuum arrangement may be formed by relating existing information units to continuum attributes. This could be done by, for example, entering data such as that of FIG. 2a into a data structure.

Another way in which continuum arrangements of information may be formed is illustrated in FIG. 3. Items configured on display screen 52 of FIG. 3a are part of a GUI which may be used for arranging information units. These items include axis 54, pointer 56, information unit icons 62, 64, 66 and 68, and entry button 60. In the embodiment of FIG. 3a, information unit icons 62, 64, 66 and 68 represent information units which may be suitable for a system administration, or platform management, application. The information unit icons may represent static information units which exist at the time continuum arrangements are formed. In some cases, the information unit icons may also represent pieces of ad hoc information, however. This may be done in case for which the information unit may be described, even if the value of the information unit is not yet established or is varying. For example, the system and network quantities represented by information unit icons 62, 64, 66 and 68 may be specifically described, although their values at a given time in the future are not known. An ordering of the information units may therefore be established, although the actual collection of the information may not be performed until such time as display of the information units is required.

Figure 3A:
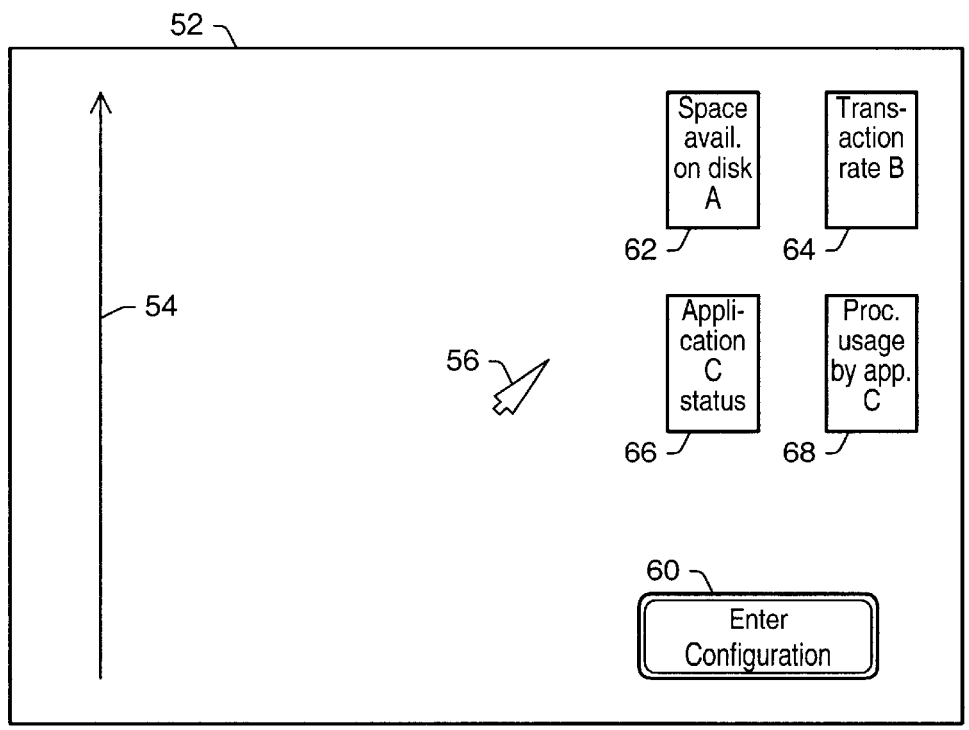
FIG. 3 illustrates use of a graphical user interface for configuration of information units into continuum arrangements for display.
Figure 3B:
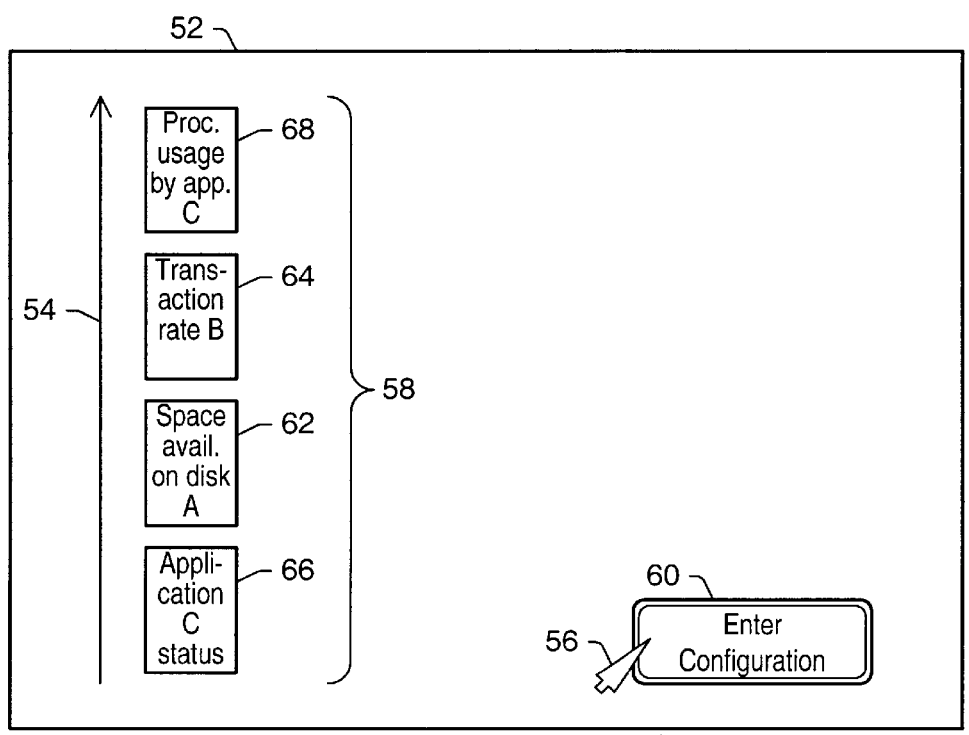

Pointer 56 may be moved across the screen using a pointing device such as a mouse or trackball, and used to "drag" the icons to different positions on the screen. Such dragging is typically done by moving the pointer to overlie the icon to be moved, depressing a button associated with the pointing device, keeping the button depressed while moving the icon with the pointer, and releasing the button to "drop" the icon at the desired position. An organizer of information can therefore use the GUI illustrated in FIG. 3a to move information unit icons 62, 64, 66 and 68 into a desired sequence 58 along axis 54, as shown in FIG. 3b. In the embodiment of FIG. 3, sequence 58 may be entered into a computer system associated with display screen 52 by using a pointing device to actuate entry button 60. Upon actuation of entry button 60 (e.g., by depressing a button associated with the pointing device while the pointer is positioned over entry button 60), the relative positions of the information unit icons within sequence 58 are communicated to the computer system. These relative positions may be used to establish ordering of the corresponding information units within a continuum arrangement. This ordering may be established, for example, by setting a policy for assigning continuum labels to the information units. In this way, the organizer of the information may establish continuum arrangements in a relatively simple, intuitive way, without needing to directly assign labels or attributes to information units.

In the embodiment of FIG. 3b, the information unit icons are arranged along axis 54 with icon 66 representing information on the status of application C followed by icon 62 representing information on the space available on disk A. Icon 62 is followed by icon 64 representing information on transaction rate B, and icon 68 representing information on processor utilization, or usage, by application C. A criterion used to arrive at this ordering might be, for example, importance of the information represented by icons 62, 64 and 68 to the status of Application C, represented by icon 66. In some embodiments, arrangement of information unit icons into a sequence might be done without the presence of an axis such as axis 54 on the screen. Axis 54 may be advantageous in establishing a direction and/or position reference for the sequence, but in some embodiments relative positions of the information unit icons may also be established without an axis and subsequently communicated to the computer system. Such arrangement of information unit icons without using an axis may also be applicable to some embodiments of the formation of two-dimensional and three-dimensional sequences described further below.

Figure 3C:
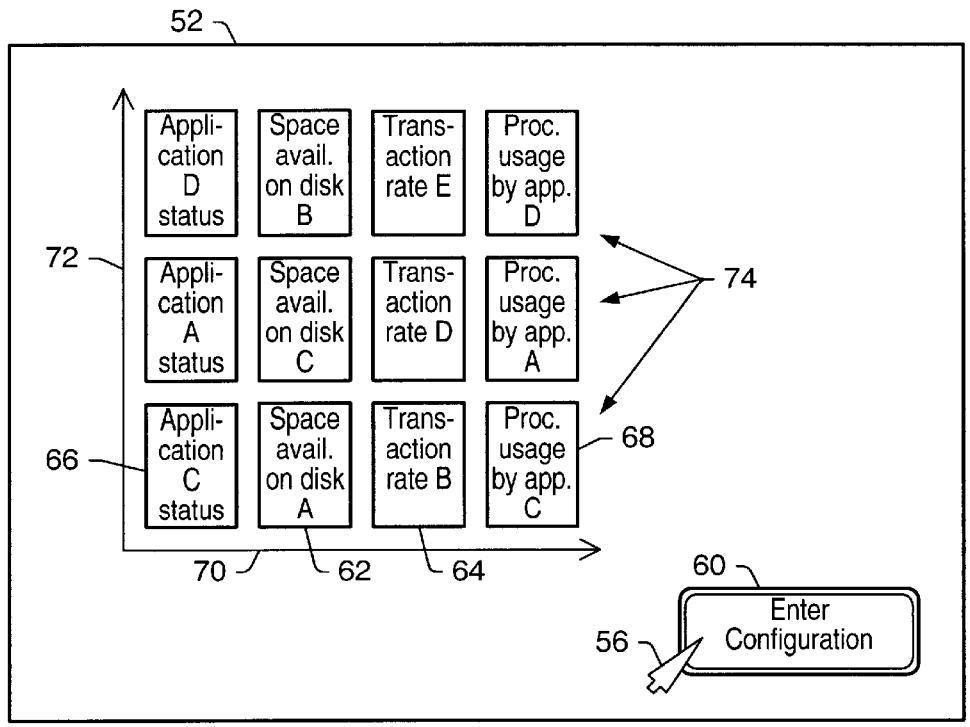

Formation of a two-dimensional sequence of information unit icons using a GUI is illustrated in FIG. 3c. An x-axis 70 and y-axis 72 are displayed on display screen 52, such that information unit icons 74 may be arranged with respect to both axes using, for example, pointer 56 and a pointing device. In the embodiment of FIG. 3c, information unit icons representing information regarding status of applications (i.e., application programs executable on a computer system or network) are arranged vertically along y-axis 72. The ordering of these icons representing application status information could be determined by, for example, importance of each application on a given system or network. Arranged horizontally adjacent each of the application status information unit icons are information unit icons representing disk space available, a transaction rate, and processor utilization by the application. As in the case of sequence 58 of FIG. 3b, a criteria for ordering of the information unit icons along the x-axis could be importance of the information unit corresponding to each icon to the application status represented by an icon in the same row. In the embodiment of FIG. 3c, therefore, the information units represented by icons within the same column are related as consisting of the same type of information (e.g., an amount of available disk space or a transaction rate). The information units represented by icons within the same row are related by relevance to a particular application. Each row or column of the icon configuration of FIG. 3c may be considered as representing a continuum arrangement of the corresponding information units. Use of a GUI as illustrated in FIG. 3c may therefore allow multiple continuum arrangements of information units to be formed efficiently and intuitively by an organizer of the information.

Figure 3D:
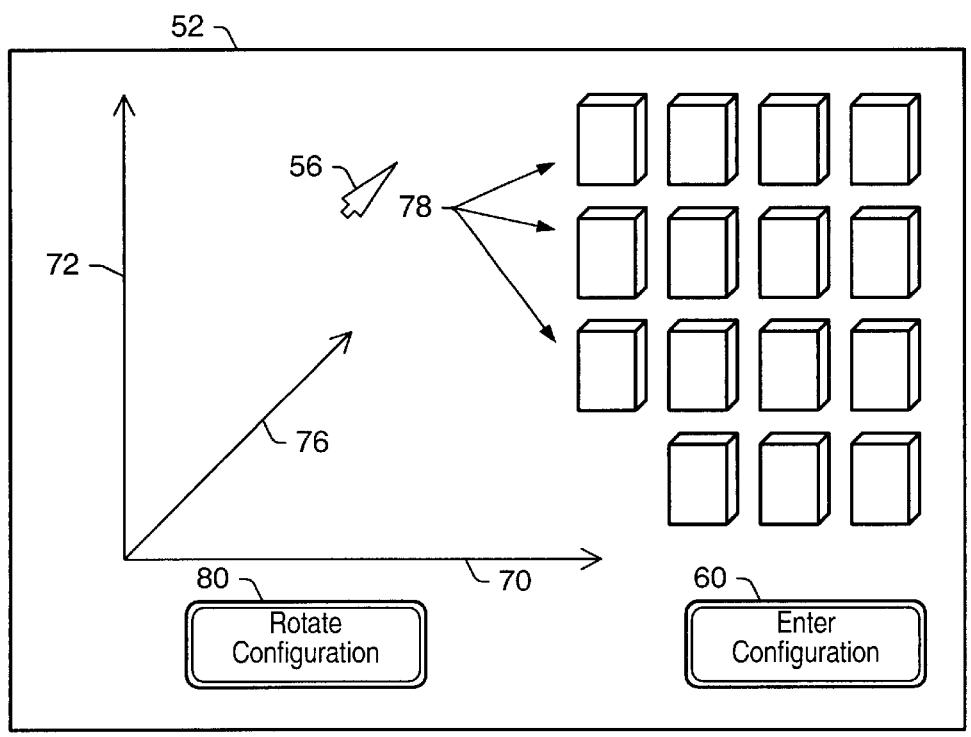
Figure 3E:
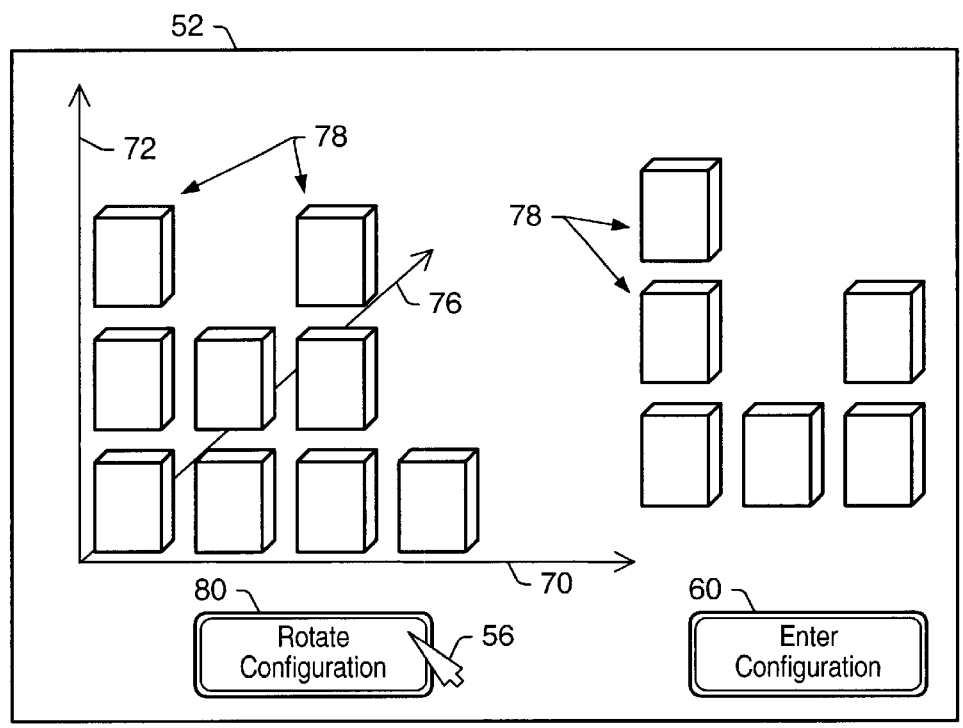
Figure 3F:
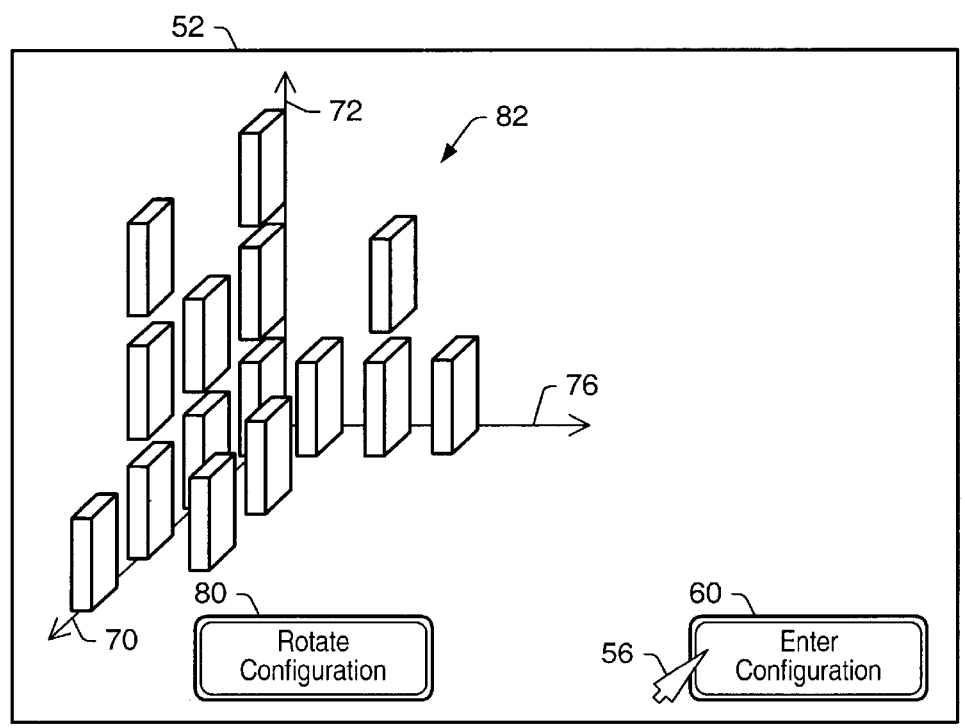

Use of a GUI to form a three-dimensional sequence of information unit icons is illustrated in FIGS. 3d–3f. In this embodiment, a z-axis 76 is displayed with x-axis 70 and y-axis 72, as shown in FIG. 3d. Information unit icons 78 may be displayed as three-dimensional shapes. Although rectangular one-dimensional and two-dimensional icons are used in FIG. 3, the icons may have any shape allowing them to be arranged into one or more sequences. In addition to entry button 60, rotation button 80 is displayed on display screen 52 in the embodiment of FIG. 3d. An illustration of the display screen after some of icons 78 are moved into an arrangement near the set of axes is shown in FIG. 3e. In order to more easily move icons into positions not in the x-y plane, the set of axes and the associated information unit icons may be rotated using rotation button 80. FIG. 3f shows the display screen after rotation of the axes and placement of the remaining information unit icons. Resulting three-dimensional arrangement 82 of information unit icons 78 may be entered into the computer system by, for example, actuating entry button 60 using a pointing device. For this and all other embodiments described herein of the method of using a GUI to configure information, operation of the GUI (e.g., movement of icons or communication of sequences to the computer system) may also be possible without using a pointing device. For example, keyboard key sequences may be used instead of a pointing device in some cases. Other methods of manipulating the GUI may also be used rather than those shown. For example, rotation of the set of axes may involve using the pointing device to select one of the axes and "drag" the set of axes and associated information units into a new orientation. As another example, an axis could be selected to allow ordering of information unit icons with respect to only that axis. Sequential selection of one axis at a time (or possibly a pair of axes in a particular plane) and arrangement of information unit icons with respect to each axis may allow formation of three-dimensional configurations without the need for rotation of a set of axes. In such an embodiment, a three-dimensional configuration may be formed by combining multiple one- or two-dimensional sequences entered using the GUI.

Figure 4:
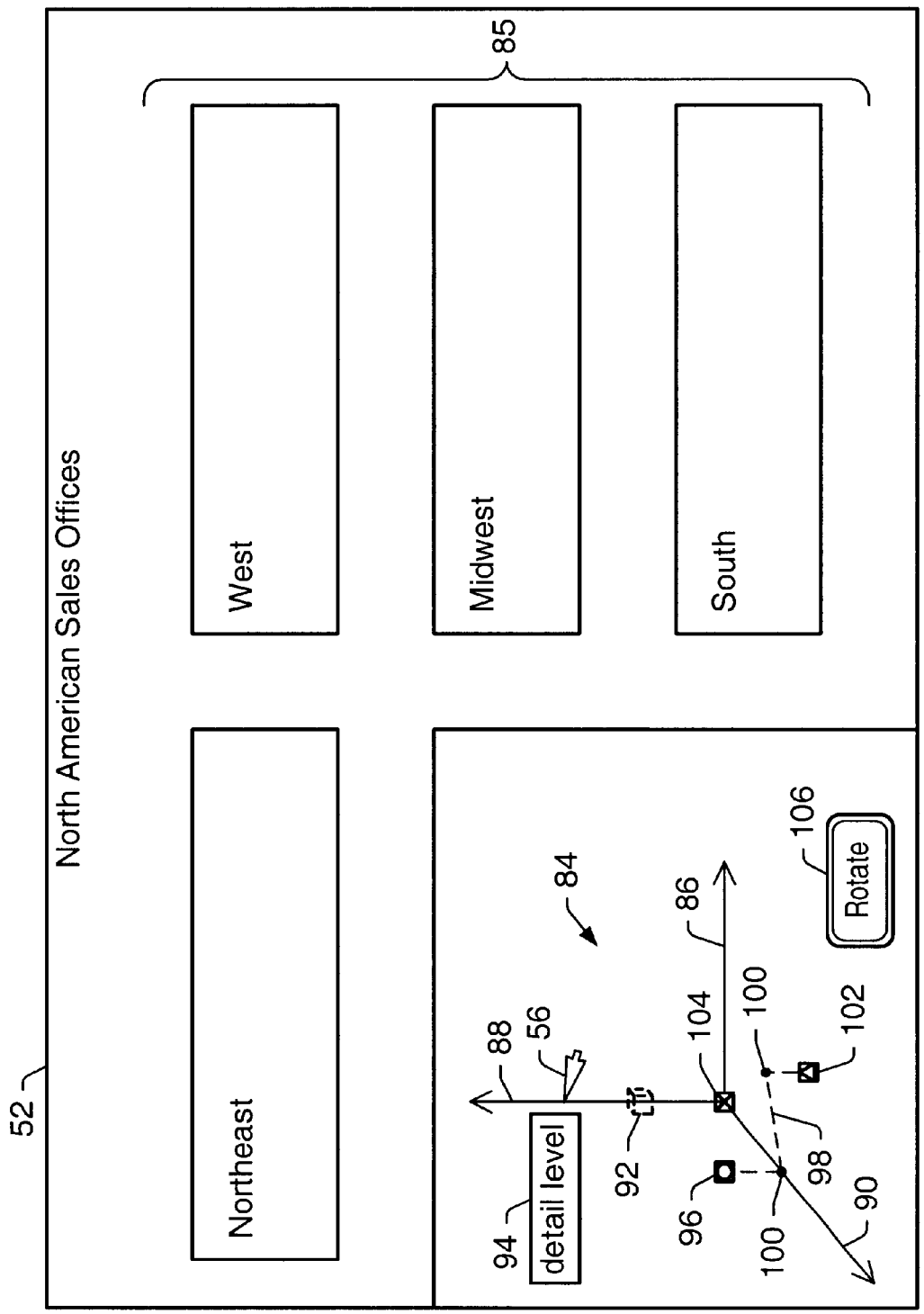
FIG. 4 illustrates a display screen with a displayed information unit and a three-dimensional navigation tool.

Formation of continuum arrangements of information units by using a GUI as shown in FIG. 3 or by other methods, such as entering a policy into a rules database or entering continuum labels into a data structure, allows the information to be displayed so that desired information units may be easily accessed. An embodiment of a method of displaying information is illustrated in FIG. 4. In the embodiment of FIG. 4, navigation tool 84 is displayed on a portion of display screen 52. Navigation tool 84 includes x-axis 86, y-axis 88 and z-axis 90, forming a set of three axes. The axes preferably form a rectangular coordinate system. Selectable regions such as selectable region 92 (delineated using dashed lines) are configured in the vicinity of the set of axes. In the embodiment of FIG. 4, the selectable regions are typically not visible unless currently or previously selected by a viewer of the information. In other embodiments, a small icon may be displayed at the position of each selectable region, although such icons may make the navigation tool appear cluttered and be more difficult to read and navigate. Each selectable region corresponds to an information unit accessible by the computer system, and selection of a selectable region (typically by using a pointing device) causes the corresponding information unit to be displayed on a portion of display screen 52 not used for display of navigation tool 84. In the embodiment of FIG. 4, for example, the displayed information unit 85 contains information regarding sales offices.

The position of each selectable region relative to the axes is determined by a set of coordinates associated with the information unit corresponding to the selectable region. For the rectangular coordinate system of navigation tool 84 in FIG. 4, for example, the position of a selectable region is determined by an x-coordinate, a y-coordinate and a z-coordinate. The x-coordinate is proportional to the value of an x-axis continuum attribute of the information unit corresponding to the selectable region, and the y-coordinate and z-coordinate are similarly proportional to values of y-axis and z-axis continuum attributes. Examples of such x-axis, y-axis and z-axis continuum attributes are given in FIG. 2b. In some embodiments of a method of displaying information using navigation tool 84, each information unit has a single unique set of coordinates, and therefore corresponds to only one of the selectable regions configured within navigation tool 84. Alternatively, an information unit may be assigned more than one set of coordinates in some embodiments, and correspond to more than one selectable region.

Navigation tool 84 may be used to display any collection of information including information units to which coordinates may be assigned. For example, the information units corresponding to the selectable regions in navigation tool 84 may be web pages, and the collection of information a web site comprising the pages. The organizer of the web page could, for example, select a group of pages thought to be most central to the site and assign continuum labels to these pages to give them coordinates along x-axis 86 in navigation tool 84. Other pages may be assigned continuum labels to give them coordinates displacing their corresponding selectable regions from the x-axis by various amounts in the y and/or z directions. In the embodiment of FIG. 4, the criterion for ordering along the y-direction is the level of detail of the information unit. A possible criterion for ordering along the z-direction may be relatedness of an information unit to a reference information unit, as may be implemented using the data of FIG. 2b.

In some embodiments, a single reference information unit may be used in all continuum arrangements within the information collection which are formed with respect to a reference information unit. Such a reference information unit may be assigned continuum labels such that its corresponding selectable region appears, for example, at the origin of the set of axes in navigation tool 84. In other embodiments, a different reference information unit may be used in forming each continuum arrangement, where a continuum arrangement includes a one-dimensional sequence of information units. For example, a reference information unit associated with the information unit corresponding to user starting point icon 102 of FIG. 4 could correspond to a selectable region along x-axis 86, having the same x-axis continuum value as the information unit corresponding to icon 102. In other words, the selectable region corresponding to the reference information unit associated with icon 102 could be at the position of the projection of icon 102 onto x-axis 86. Information units corresponding to other selectable regions along x-axis 86 could similarly be reference information units for other continuum arrangements.

In some embodiments, a visible indicator such as visible indicator 94 may be displayed when pointer 56 is positioned over a selectable region. In the embodiment of FIG. 4, visible indicator 94 is a text box containing a description of the criteria by which selectable regions are ordered in a direction parallel to the y-axis. This criterion is the level of detail of the subject matter of the information unit corresponding to each selectable region, and visible indicator 94 is displayed when pointer 56 is positioned over y-axis 88.

Similar indicators may be used to describe the criteria by which selectable regions are ordered along the other axes, and may also be used to describe the subject matter of an information unit corresponding to a selectable region. The display of a visible indicator giving information about a feature, such as an axis or selectable region, underlying a pointer may function in a similar manner to a "mouseover" in the JavaScript language, and may in some embodiments be implemented in this form. The use of visible indicators such as indicator 94 may allow a viewer of a collection of information to quickly "browse" through the information and grasp the way in which the collection is organized simply by using a pointing device to move pointer 56 around navigation tool 84, and observing the visible indicators corresponding to selectable regions and axes traversed by the pointer.

When an information unit is displayed by selection of a selectable region, a current position icon, icon 96 in FIG. 4, may be displayed over the selectable region corresponding to the displayed information unit. In this way, a position of the displayed information unit within the organization of the entire collection of information may be readily observed. In some embodiments, a path indication such as path indication 98 of FIG. 4 may be displayed to mark the path taken by a viewer between the selectable region corresponding to the currently-displayed information unit and previously-selected selectable regions. The previously-selected regions may be marked with an interim point icon, such as icons 100 in FIG. 4, and the region selected first by a viewer may be marked by a user starting point icon such as icon 102. In some embodiments, an intended starting point icon, such as icon 104 of FIG. 4, may be displayed to mark an information unit intended by the organizer of the collection of information to be the starting point for navigating through the collection of information. Starting point icon 104 is at the origin of the set of axes in the embodiment of FIG. 4, but could be at the position of any selectable region corresponding to an information unit intended as the starting point.

A rotation button 106 may also be included in navigation tool 84. Similar to rotation button 80 in FIG. 3, rotation button 106 may be actuated by a viewer to rotate the set of axes and selectable regions so that a particular region may be more conveniently selected. As in the case of the GUI of FIG. 3, the GUI used to implement navigation tool 84 may be interacted with in other ways than shown in FIG. 4. For example, rotation may be performed by direct manipulation of one or more axes rather than with a rotation button, or selection of selectable regions may be done without using a pointing device (for example, by using keyboard or keypad key sequences instead). As another example, an axis, or possibly a pair of axes in a particular plane, could be selected instead of rotating the set of three axes. In such an embodiment, this selection may cause a new navigation tool to be displayed which contains only the selected axis or axes and the selectable regions located along the axis or in the plane of the pair of axes. In this way, specific information units within a three-dimensional configuration may be displayable without a need to rotate the three-dimensional navigation tool.

In some embodiments, an outline of a cube may be displayed with the axes of navigation tool 84, such that the selectable regions corresponding to the information units in the displayed information collection are within the cube. In such an embodiment navigation tool 84 may be referred to as a navigation cube. Any other shape could alternatively be displayed, such as a non-cubic rectangular box or a sphere. In some embodiments, selectable units could be configured about the axes using coordinates from other than rectangular coordinate systems. For example, a spherical coordinate system could be used, in which coordinates were based on values of radial, azimuthal, and elevational continuum attributes assigned to information units.

Depending on the size of the information unit corresponding to a selected region of navigation tool 84, either all or part of the information unit is displayed on the display screen along with navigation tool 84. Particularly if the information unit is relatively large (e.g. an entire web page) and the display screen is relatively small (e.g., a telephone or PDA screen), only a portion, or sub-unit, of the information unit may be displayed at one time. Determination of the order in which portions are displayed is preferably implemented using user-established display preferences as described in related application "Establishment of Information Display Policy for Diverse Display Devices" by MacPhail. Such setting of display preferences may also be used to configure other display features such as the position on display screen 52 occupied by navigation tool 84, and which portions of the display screen not occupied by the navigation tool are used for display of the selected information unit.

Figure 5:
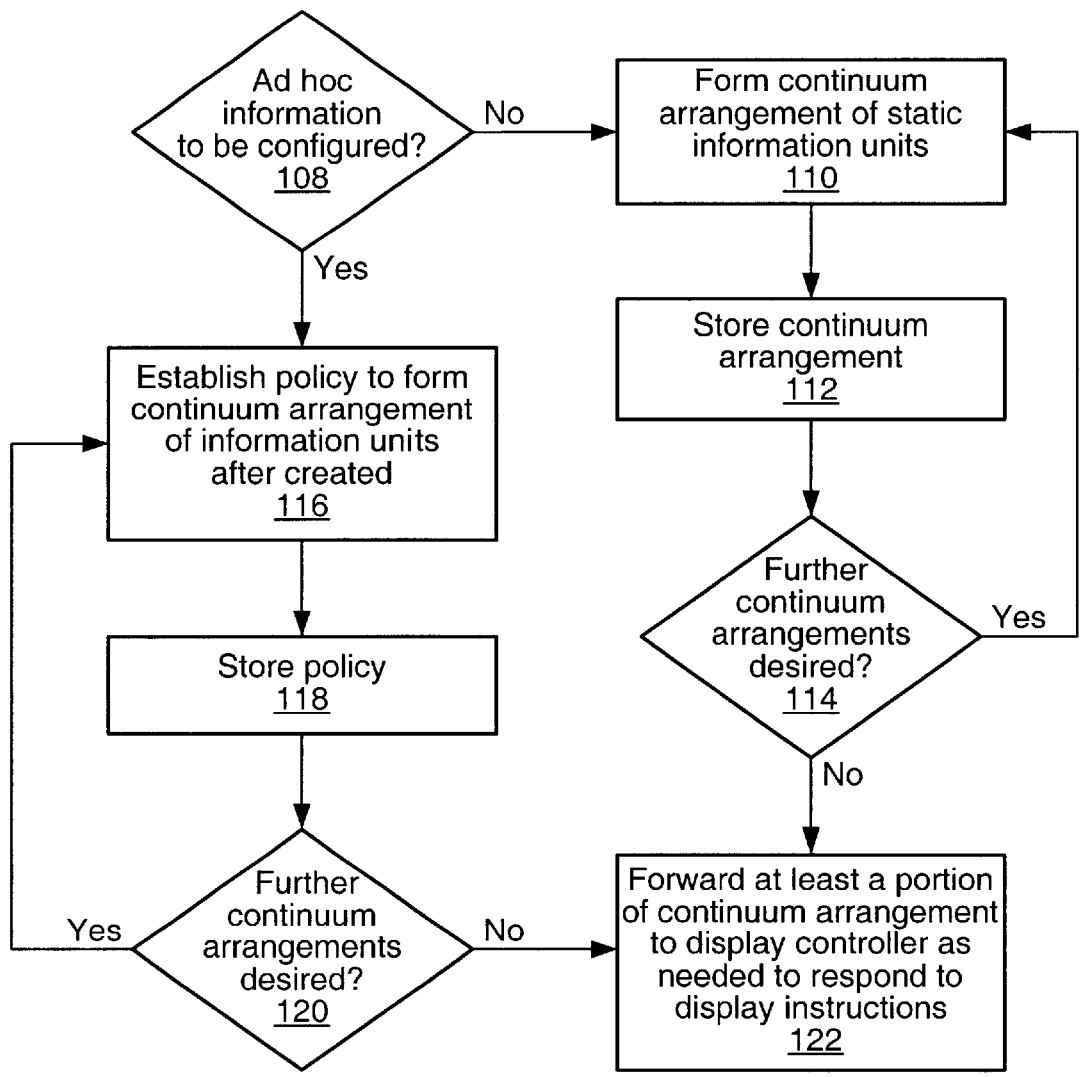
FIG. 5 is a flow diagram illustrating a method of configuring information for display.

Turning now to FIG. 5, a flow diagram illustrating a method of configuring information units for display, or setting policy for display of the information units, is shown. If the information to be displayed is static information ("no" branch of decision box 108), then a continuum arrangement of the existing information units may be formed (box 110). The continuum arrangement may be formed by assigning a continuum label to each information unit to be included within the continuum, as described above with reference to FIGS. 2 and 3. The continuum arrangement is then stored, typically in one or more data structures, which may have contents similar to the examples shown in FIG. 2. More continuum arrangements may be formed ("yes" branch of decision box 114) by assigning additional continuum labels to the information units. If, for example, a three-dimensional configuration of information units is desired, as would be appropriate for use of a three-dimensional navigation tool as illustrated in FIG. 4, at least three continuum arrangements are needed. Specifically, each information unit in a three-dimensional configuration has three continuum attributes, the values of which are reflected in coordinates used to allow display of the information unit from the three-dimensional navigation tool.

If the information to be displayed is ad hoc information ("yes" branch of decision box 108), a policy is established to form a continuum arrangement of information units which may be created at a time subsequent to establishment of the policy. Formation of the continuum arrangement preferably includes assignment of continuum labels to the information units; establishing the policy therefore preferably includes establishing rules for assignment of the continuum labels. The policy may be established by methods including entering such rules into a rules database. In applications for which each of the information units may be represented by an icon although the specific information unit may not yet exist, the policy may also be established using a GUI as described above with reference to FIG. 3. The policy is stored (box 118), typically in a rules database although possibly in other types of data structure. If further continuum arrangements are desired ("yes" branch of decision box 120), policy for formation of additional continuum arrangements, typically by assigning further continuum labels to the information units, is established.

Whether static or ad hoc information is being configured, at least a portion of one or more of the established continuum arrangements may be forwarded to a display controller such as display controller 24 of FIG. 1. The information forwarded to the display controller may be in the form of a markup language document, such as an Extended Markup Language (XML) document. In such an embodiment, the continuum labels may be used as tags in the markup language document. The forwarding may be performed in some embodiments by a control program such as program 18 of FIG. 1, typically in response to an instruction for display detected by the control program. The control program may create or collect the needed information unit or units in the case of ad hoc information display. Performing the method of FIG. 5 may involve use of a configuration or "setup" routine associated with, e.g., an application program or operating system.

Figure 6A:
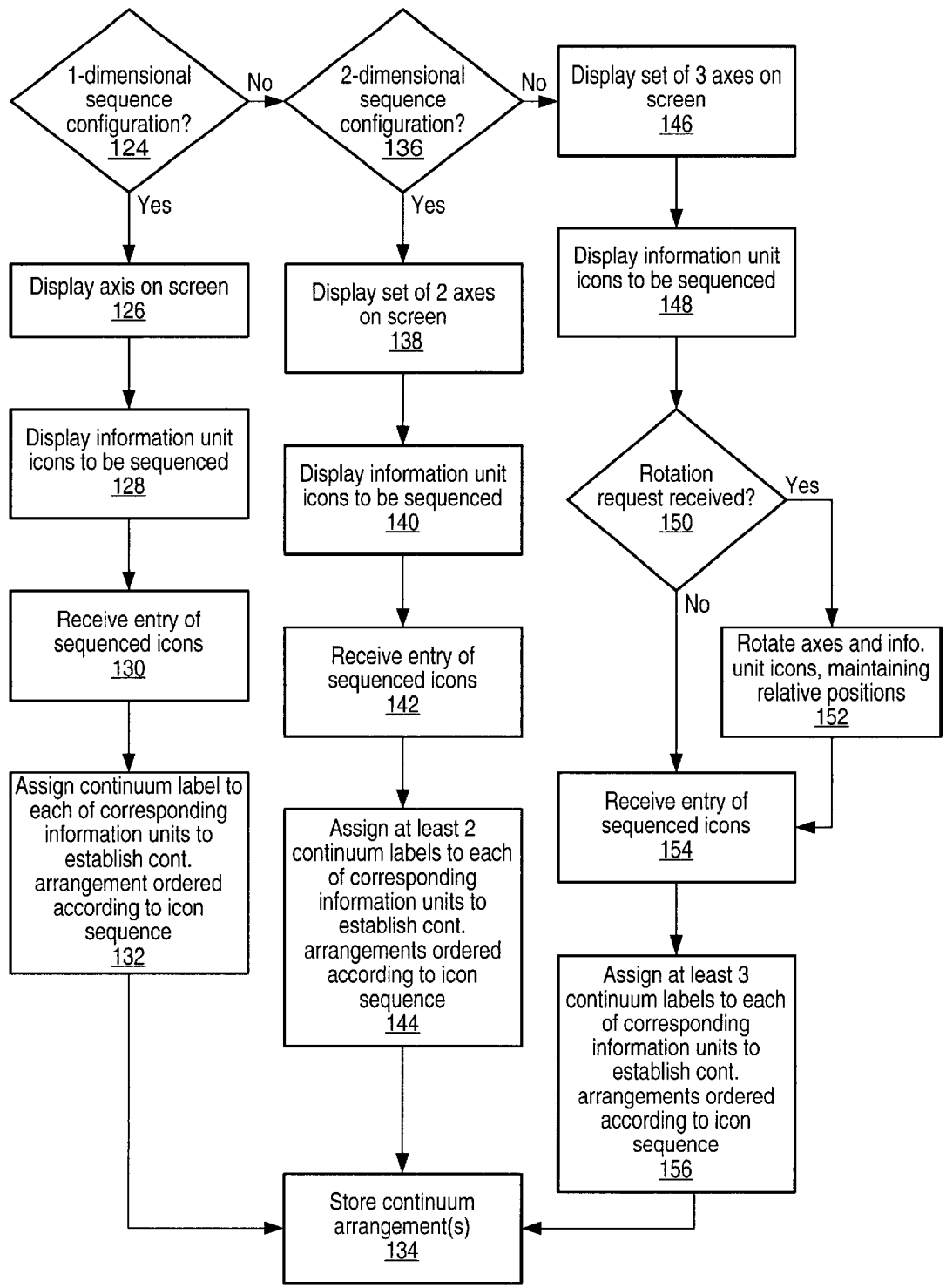
FIG. 6 includes flow diagrams illustrating methods for using a graphical user interface to configure information for display.

Methods of configuring information using a GUI are illustrated in the flow diagrams of FIG. 6. In the method of FIG. 6*a*, entry of one or more sequences of information unit icons is received. The method of FIG. 6*a* may be performed by a display controller and/or processor within the device on which the information is being displayed (e.g., a computer, telephone, PDA, etc.). Alternatively or in addition, this method may be performed by a separate computer system on which information units and continuum arrangements of the information units are stored. If a one-dimensional sequence is to be entered into the computer system for formation of a single continuum arrangement ("yes" branch of decision box 124), a single axis is displayed on the display screen of the display device (box 126), and information unit icons corresponding to the information units to be ordered within a continuum arrangement are configured upon the display screen (box 128). Entry by a user of the computer system (an organizer of the information) of a sequence of the information unit icons is subsequently received (box 130). Continuum labels are assigned to the corresponding information units, or policy established for assignment of the continuum labels (in the case of ad hoc information), such that the information units are ordered within a continuum arrangement according to the sequence of information unit icons entered by the user (box 132). As noted above in the discussion of FIG. 3, the axis may be omitted in some embodiments of forming a one-dimensional sequence of information unit icons.

If a two-dimensional sequence of information unit icons is to be entered into the computer system ("yes" branch of decision box 136), a set of two axes is configured on the display screen (box 138) along with the information unit icons to be sequenced (box 140). A two-dimensional sequence of information unit icons is received (box 142), and continuum arrangements of the corresponding information units are formed, or policy for formation of the continuum arrangements is established (box 144). In the case for which entry of a three-dimensional sequence of information units is desired ("no" branch of decision box 136), a set of three axes is configured on the screen (box 146) with the information unit icons to be sequenced (box 148). In the embodiment of FIG. 6*a*, an instruction to rotate the set of axes, along with any information unit icons placed in the proximity of the axes, may be received ("yes" branch of decision box 150), in which case the axes and icons are rotated (box 152). The axes and icons are rotated in such a way that the relative positions of the already-placed icons with respect to the axes and each other are maintained. Entry of a three-dimensional sequence of information unit icons is received (box 154), and continuum arrangements of the corresponding information units are formed, or policy set for formation of these continuum arrangements (box 156). The ordering of information units within the continuum arrangements so formed corresponds to that of the entered information unit icon sequence. Any continuum arrangements or policies are stored, typically in one or more data structures or rules databases (box 134). It is noted that adjacent display steps in the embodiment of FIG. 6*a* (e.g. 126 and 128, or 146 and 148) may be performed in the opposite order, or simultaneously. Such display steps may occur rapidly enough to appear simultaneous to a user no matter which step order is used.

Figure 6B:
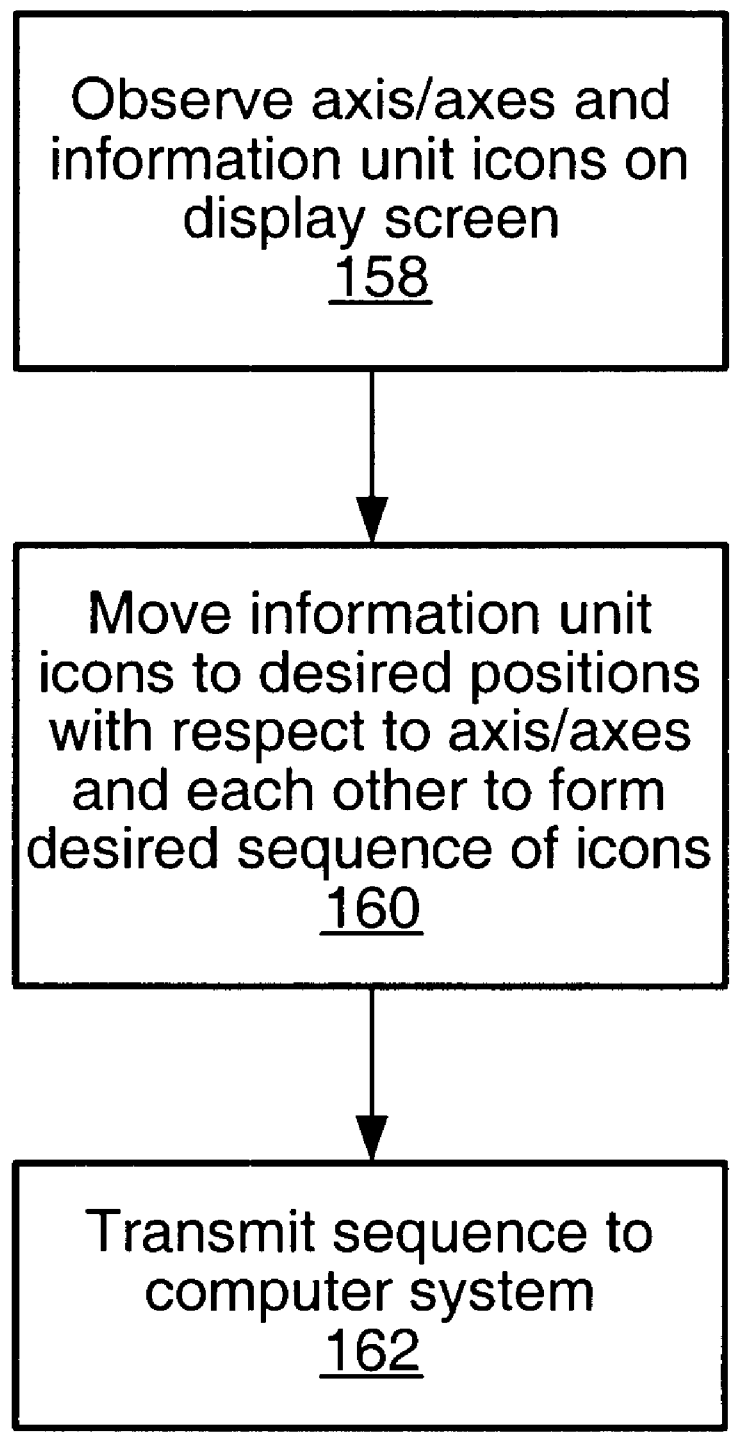

The flow diagram of FIG. 6*b* illustrates a method of using a GUI to direct formation of continuum arrangements of information units. The method of FIG. 6*b* may be performed by an organizer of the information to be displayed. Upon observing one or more axes and a group of information unit icons displayed on a display screen (box 158), a user of the GUI moves the information unit icons to desired positions with respect to the axis or axes and each other, so that a desired sequence of the icons is obtained (box 160). The information unit icons may be moved by using a pointing device to move a pointer configured on the screen, or by other methods such as keyboard or keypad key sequences. The sequence is transmitted to the computer system by which the information units corresponding to the information unit icons may be obtained (box 162). The transmission of the sequence to the computer system may be done by using a pointing device to actuate an entry button configured on the display screen, or by other techniques such as performing a keyboard or keypad key sequence.

Figure 7:
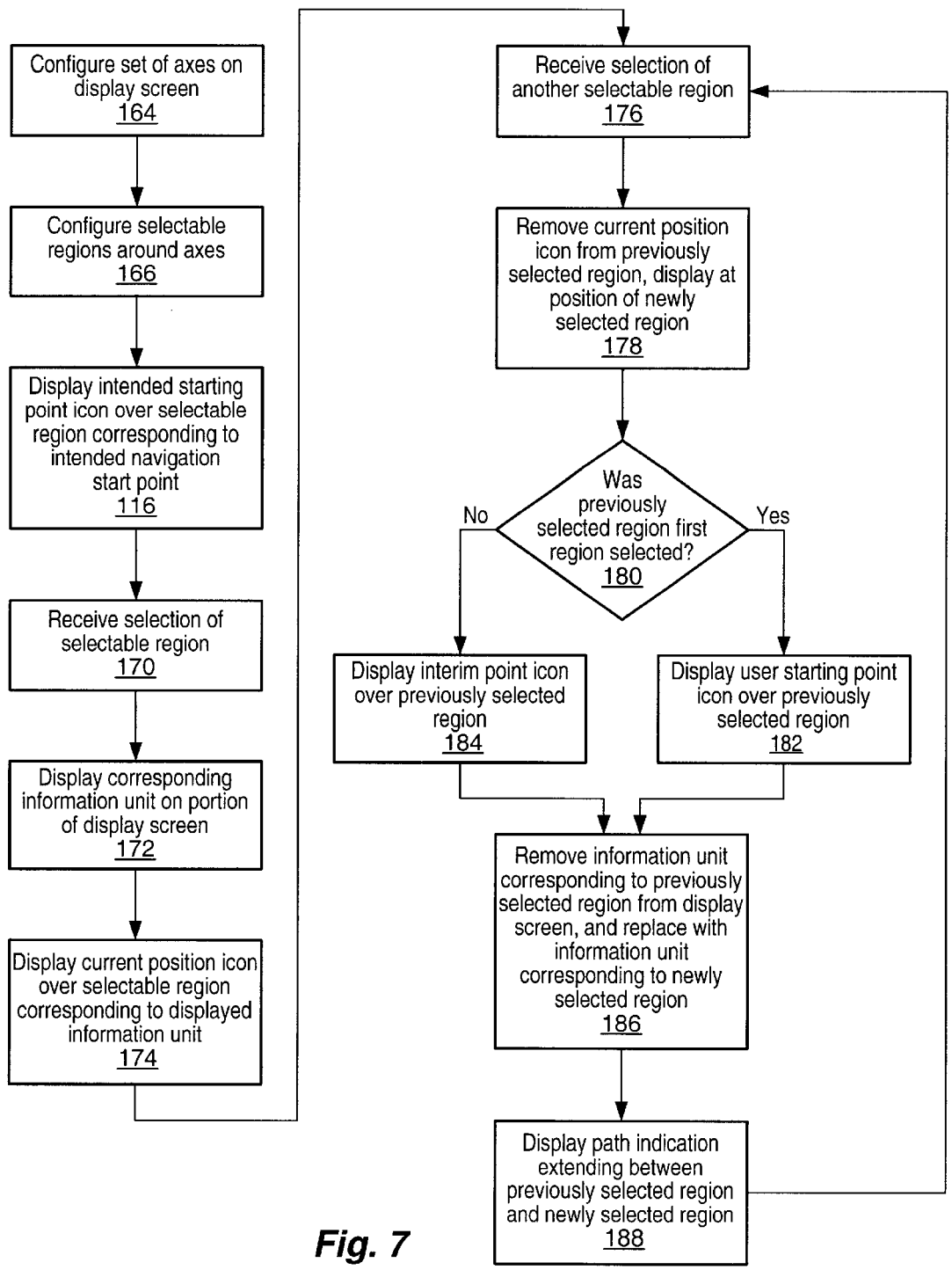
FIG. 7 is a flow diagram illustrating a method of displaying information using a navigation tool.

Turning now to FIG. 7, a flow diagram for a method of displaying a collection of information is shown. The method of FIG. 7 may be performed by a display controller and/or processor of the device displaying the information, and/or by a display controller and/or processor of a computer system which accesses the information being displayed. For example, display of a navigation tool such as navigation tool 84 of FIG. 4 may be done by the processor and display controller of the display device, while information units to be displayed are sent to the display device by the display controller of the computer system. A set of axes, preferably a set of three axes forming a rectangular coordinate system, is configured (or displayed) on the display screen of the display device (box 164). Selectable regions are configured on and/or around the axes, where each selectable region corresponds to an information unit which may be displayed (box 166). As noted above in the discussion of FIG. 4, icons may be positioned over the selectable regions in some embodiments, and an outline of a cube or other shape may be displayed such that the selectable regions are within the shape. As another possibility, a visible outline of each selectable region could be displayed in some embodiments. In the embodiment of FIG. 7, an intended starting point icon, similar to icon 104 in FIG. 4, is displayed at the position of the selectable region corresponding to the information unit intended by the organizer of the information collection to be the starting point for navigating the information (box 168).

After selection of a selectable region is received (box 170), the corresponding information unit is displayed on the display screen, while continuing display of the navigation tool including the axes and selectable regions (box 172). Display of the corresponding information unit typically includes sending of the information unit from the computer system to the display device, unless the information unit has been previously stored in the display device (e.g., in a buffer). A current position icon, such as icon 96 of FIG. 4, may be displayed at the position of the selectable unit corresponding to the displayed information unit (box 174).

When selection of another selectable region is received (box 176), the current position icon is removed from the position of the previously selected region, and displayed at the position of the newly selected region (box 178). If the previously selected region was the first selectable region selected ("yes" branch of decision box 180), a user starting point icon similar to icon 102 of FIG. 4 may be displayed at the position of the previously selected region (box 182). Otherwise, an interim point icon, such as icon 100 of FIG. 4, may be displayed at the position of the previously selected region (box 184). The information unit corresponding to the previously selected region is removed from the display screen, and that corresponding to the newly selected region is displayed instead, along with the navigation cube (box 186). In the embodiment of FIG. 7, a path indication, such as a line or dashed line, extending from the previously selected region to the currently selected region of the navigation tool is displayed (box 188). For each additional selection of a selectable region within the navigation tool, steps 176 through 188 may be repeated.

The method of FIG. 7 is merely an exemplary embodiment, and many variations are possible. For example, some of the steps in FIG. 7, including steps 168, 182, 184 and 188, may not be performed in some embodiments of the method. Many of the adjacent display steps in FIG. 7 may be performed in a different order, or performed simultaneously. For example, the order of steps 178, 182/184, 186 and 188 could be changed, or some or all of these steps could be performed simultaneously. As noted above in the description of FIG. 6a, the speed of implementation of the display steps may make adjacent steps appear simultaneous to a viewer regardless of their order.

Program instructions implementing methods such as those described above may be transmitted over or stored on a carrier medium. The carrier medium may be a transmission medium such as a wire, cable, or wireless transmission link, or a signal traveling along such a wire, cable or link. Transmission medium 30 of FIG. 1 is an example of such a transmission medium. The carrier medium may also be a storage medium, such as a read-only memory, a random access memory, a magnetic or optical disk, or a magnetic tape, similar to storage medium 14 of FIG. 1. One or more data structures and/or rules databases may similarly be transmitted over or stored upon such a carrier medium.

It will be appreciated by those skilled in the art having the benefit of this disclosure that this invention is believed to provide methods for configuring information units stored in a computer system for display on a display device having arbitrary size. Furthermore, it is also to be understood that the form of the invention shown and described is to be taken as exemplary, presently preferred embodiments. Various modifications and changes may be made without departing from the spirit and scope of the invention as set forth in the claims. For example, relative orientation of the x-, y- and z-axes of FIGS. 3 and 4 could be changed, and other criteria than those recited herein may be used to organize information along any of these axes. Furthermore, the system and methods described herein may be implemented using many combinations of hardware and/or software, and at one or more of many different levels of hardware and/or software, as is the case with many computer-based applications. It is intended that the following claims be interpreted to embrace all such modifications and changes.

What is claimed is:

1. A method of configuring information, comprising:
    assigning labels including an x-axis continuum label, a y-axis continuum label and a z-axis continuum label to each of multiple information units accessible using a computer system;
    assigning a starting point label to at least one of the multiple information units, wherein a value of an attribute corresponding to the starting point label indicates whether the corresponding information unit is intended as a starting point for viewing the information; and
    wherein a value of an attribute corresponding to the z-axis continuum label indicates a level of relatedness of a corresponding information unit to a reference information unit.

2. The method as recited in claim 1, wherein a value of an attribute corresponding to the x-axis continuum label indicates a position of a corresponding information unit within a sequence of closely-related information units.

3. The method as recited in claim 1, wherein a value of an attribute corresponding to the y-axis continuum label indicates a level of detail of a subject matter of a corresponding information unit.

4. The method as recited in claim 1, wherein the reference unit is within a sequence of closely-related information units, and wherein the sequence is established to be of particular importance within the information.

5. The method as recited in claim 4, wherein the sequence is established to be of particular importance by an organizer of the information.

6. The method as recited in claim 5, wherein the sequence is established to be of particular importance using input from a viewer of the information.

7. The method as recited in claim 1, wherein said assigning labels comprises setting a policy for assignment of a label to each of the multiple information units, wherein the policy is adapted for at least one of the multiple information units to be created after said setting a policy.

8. The method as recited in claim 7, wherein said setting a policy comprises entering rules into a rules database, wherein said rules characterize collection of the at least one of the multiple information units in response to an instruction for display of the at least one information unit, and wherein said rules are adapted for the instruction for display to occur after said entering rules.

9. The method as recited in claim 1, wherein said assigning labels comprises describing an attribute of an information unit and a value of the attribute.

10. The method as recited in claim 9, wherein:
    the x-axis continuum label describes a sequence attribute and a value of the sequence attribute for the corresponding information unit;
    the y-axis continuum label describes a specificity attribute and a value of the specificity attribute for the corresponding information unit; and
    the z-axis label describes a relatedness attribute and a value of the relatedness attribute for the corresponding information unit with respect to a reference information unit.

11. The method as recited in claim 10, wherein:
    the reference unit is within a sequence of closely-related information units;
    the sequence is established to be of particular importance within the information; and
    the reference information unit is associated with values of the sequence attribute and specificity attribute which are identical to those associated with the corresponding information unit.

12. The method as recited in claim 10, wherein each of the multiple information units is associated with a unique combination of values of the sequence attribute, specificity attribute, and relatedness attribute.

13. A method of displaying computer-based information using a graphical user interface, comprising:

configuring a set of three axes on a display screen associated with a computer system;

configuring multiple selectable regions on the display screen in the vicinity of the axes, wherein each of the selectable regions corresponds to an information unit accessible by the computer system, wherein the graphical user interface is adapted for selection of one of the selectable regions to cause a corresponding information unit to be displayed on the display screen, and wherein a position of each of the selectable regions with respect to the three axes is determined by a set of coordinates assigned to the corresponding information unit; and configuring an intended starting point icon at the position of a selectable region corresponding to an information unit designated as an intended starting point as indicated by a value of an attribute corresponding to a starting point label associated with the information unit.

14. The method as recited in claim 13, wherein said configuring a set of three axes comprises configuring an x-axis, y-axis, and z-axis.

15. The method as recited in claim 14, wherein the set of coordinates assigned to the corresponding information unit comprises numbers proportional to values of an x-axis attribute, a y-axis attribute, and a z-axis attribute.

16. The method as recited in claim 15, further comprising displaying a visual indicator when a pointer configured on the display screen is aligned over the x-axis, y-axis or z-axis, wherein the visual indicator characterizes the x-axis attribute, y-axis attribute or z-axis attribute, respectively.

17. The method as recited in claim 13, wherein said configuring a set of three axes comprises configuring a rectangular coordinate system.

18. The method as recited in claim 13, wherein said selection of a selectable region comprises:

manipulation of a pointing device to align a pointer configured on the display screen over the selectable region; and actuation of a selection actuator associated with the pointing device.

19. The method as recited in claim 13, further comprising displaying one of the information units accessible by the computer system on the display screen in response to selection of a corresponding selectable region, wherein said configuring of the axes, selectable regions and intended starting point icon is maintained on a portion of the display screen during said displaying one of the information units.

20. The method as recited in claim 19, further comprising displaying a current position icon at the position of the corresponding selectable region to indicate a location, with respect to the axes, of the displayed information unit.

21. The method as recited in claim 13, further comprising displaying a visual indicator when a pointer configured on the display screen is aligned over a selectable region, wherein said visual indicator characterizes the corresponding information unit.

22. The method as recited in claim 13, wherein each of the information units accessible by a computer system corresponds to a single selectable region.

23. A computer-usable carrier medium, comprising:

first program instructions drawn from the carrier medium comprising a storage medium and executable on a computer system for receiving entry of an x-axis continuum label, a y-axis continuum label and a z-axis continuum label for assignment to each of multiple information units accessible by the computer system; and second program instructions drawn from the carrier medium comprising a storage medium and executable on the computer system for receiving entry of a starting point label for assignment to at least one of the multiple information units, wherein a value of an attribute corresponding to the starting point label indicates whether the corresponding information unit is intended as a starting point for viewing the computer-based information.

24. A computer-usable carrier medium, comprising:

first program instructions executable on a computer system for configuring a set of three axes on a display screen associated with the computer system;

second program instructions executable on the computer system for configuring multiple selectable regions on the display screen in the vicinity of the axes, wherein each of the selectable regions corresponds to an information unit accessible by the computer system, wherein the second program instructions are adapted for selection of one of the selectable regions to cause a corresponding information unit to be displayed on the display screen, and wherein a position of each of the selectable regions with respect to the three axes is determined by a set of coordinates assigned to the corresponding information unit; and third program instructions executable on the computer system for configuring an intended starting point icon at the position of a selectable region corresponding to an information unit designated as an intended starting point as indicated by a value of an attribute corresponding to a starting point label associated with the information unit.

25. The carrier medium as recited in claim 24, further comprising fourth program instructions executable on the computer system for displaying one of the information units accessible by the computer system on the display screen in response to selection of a corresponding selectable region, wherein said configuring of the axes, selectable regions and intended starting point icon is maintained on a portion of the display screen during said displaying one of the information units.

26. The carrier medium as recited in claim 25, further comprising fifth program instructions executable on the computer system for displaying a current position icon at the position of the corresponding selectable region to indicate a location, with respect to the axes, of the displayed information unit.

27. The carrier medium as recited in claim 24, further comprising fourth program instructions executable on the computer system for displaying a visual indicator when a pointer configured on the display screen is aligned over a selectable region, wherein said visual indicator characterizes the corresponding information unit.

28. A computer-usable carrier medium, comprising a data structure which relates information units accessible by a computer system to an x-axis continuum label, a y-axis continuum label, a z-axis continuum label and a starting point label.

29. An information-handling system, comprising:

a display screen adapted for communication with a computer system;

a means for configuring a set of three axes on the display screen;

a means for configuring multiple selectable regions on the display screen in the vicinity of the axes, wherein each of the selectable regions corresponds to an information unit accessible by the computer system, and wherein a position of each of the selectable regions with respect to the three axes is determined by a set of coordinates assigned to the corresponding information unit;

a means for causing the corresponding information unit to be displayed on the display screen in response to selection of one of the selectable regions; and a means for configuring an intended starting point icon at the position of a selectable region corresponding to an information unit designated as an intended starting point, as indicated by a value of an attribute corresponding to a starting point label associated with the designated information unit.

30. The system as recited in claim 29, wherein said means for configuring multiple selectable regions comprises a display controller within the computer system, and wherein the display controller is adapted to receive the set of coordinates assigned to an information unit.

31. The system as recited in claim 30, further comprising a storage medium operably coupled to the display controller, wherein the storage medium is adapted for storage of values of an x-axis attribute, a y-axis attribute and a z-axis attribute for each of the multiple information units, and wherein the set of coordinates comprises numbers proportional to the values of the x-axis, y-axis and z-axis attributes.

32. The system as recited in claim 31, wherein said storage medium is further adapted for storage of a value of a starting point attribute for at least one of the multiple information units.

33. The system as recited in claim 29, further comprising a means for displaying a current position icon at the position of a selectable region corresponding to a displayed information unit, to indicate a location with respect to the axes of the displayed information unit.

34. The system as recited in claim 29, further comprising a means for displaying a visible indicator on the display screen when a pointer configured on the display screen is aligned over a selectable region, wherein the visible indicator characterizes the corresponding information unit.

* * * * *

UNITED STATES PATENT AND TRADEMARK OFFICE
CERTIFICATE OF CORRECTION

| | | |
|---|---|---|
| PATENT NO. | : 6,501,469 B1 | Page 1 of 1 |
| DATED | : December 31, 2002 | |
| INVENTOR(S) | : MacPhail | |

It is certified that error appears in the above-identified patent and that said Letters Patent is hereby corrected as shown below:

<u>Column 22,</u>
Lines 15-38, claim 24 should read as follows:

A computer-usable carrier medium, comprising:

first program instructions executable on a computer system for configuring a set of three axes on a display screen associated with the computer system;

second program instructions executable on the computer system for configuring multiple selectable regions on the display screen in the vicinity of the axes, wherein each of the selectable regions corresponds to an information unit accessible by the computer system, wherein the second program instructions are adapted for selection of one of the selectable regions to cause a corresponding information unit to be displayed on the display screen, and wherein a position of each of the selectable regions with respect to the three axes is determined by a set of coordinates assigned to the corresponding information unit;

third program instructions executable on the computer system for configuring an intended starting point icon at the position of a selectable region corresponding to an information unit designated as an intended starting point as indicated by a value of an attribute corresponding to a starting point label associated with the information unit; and wherein a value of an attribute corresponding to the z-axis continuum label indicates a level of relatedness of a corresponding information unit to a reference information unit.

Signed and Sealed this

Twenty-ninth Day of July, 2003

JAMES E. ROGAN
*Director of the United States Patent and Trademark Office*